(12) United States Patent
Spagnola

(10) Patent No.: US 9,590,989 B2
(45) Date of Patent: *Mar. 7, 2017

(54) DATA ACCESS AND ANONYMITY MANAGEMENT

(71) Applicant: Pearson Education, Inc., New York, NY (US)

(72) Inventor: Perry M. Spagnola, Phoenix, AZ (US)

(73) Assignee: PEARSON EDUCATION, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/017,408

(22) Filed: Feb. 5, 2016

(65) Prior Publication Data

US 2016/0352730 A1 Dec. 1, 2016

Related U.S. Application Data

(63) Continuation of application No. 14/724,620, filed on May 28, 2015, now Pat. No. 9,288,056.

(51) Int. Cl.
*H04L 29/06* (2006.01)
*H04L 9/32* (2006.01)
*H04L 9/08* (2006.01)

(52) U.S. Cl.
CPC ........ *H04L 63/0876* (2013.01); *H04L 9/0894* (2013.01); *H04L 9/3236* (2013.01);
(Continued)

(58) Field of Classification Search
CPC .......... H04L 9/00; H04L 9/32; G06F 21/6254
(Continued)

(56) References Cited

U.S. PATENT DOCUMENTS

| 4,175,339 A | 11/1979 | Jones |
| 5,947,747 A | 9/1999 | Walker et al. |

(Continued)

OTHER PUBLICATIONS

Neubauer el al., "A methodology for the pseudonymization of medical data" journal homepage: www.intl.elsevierhealth.com/journals/ijmi, Date: Oct. 16, 2010, p. 190-204.*

(Continued)

*Primary Examiner* — Harunur Rashid
(74) *Attorney, Agent, or Firm* — Kilpatrick Townsend & Stockton LLP

(57) ABSTRACT

Techniques described herein provide data access and data anonymity management within various implementations of content distribution networks. In some embodiments, a data anonymity management system may include multiple different data stores configured to store identity data, user data, and/or linking data, as well as a data anonymity server configured to support data anonymity features such as active user data anonymity, one-way linking and permanently breakable links between user identity data and associated user data. In some embodiments, storage systems and techniques may be used for storing identity data, user data, and link data in multiple different data stores, with different data storage requirements and different processes and policies for data availability, data backup, online disaster recovery, offline storage archiving, and the like. Additionally, cryptographic hash functions may be used to implement one-way encryption between identity data and user data.

20 Claims, 13 Drawing Sheets

(52) U.S. Cl.
CPC ........ *H04L 9/3242* (2013.01); *H04L 63/0407* (2013.01); *H04L 63/0428* (2013.01); *H04L 63/12* (2013.01); *H04L 2209/42* (2013.01); *H04L 2209/60* (2013.01)

(58) Field of Classification Search
USPC ........................................................ 713/168
See application file for complete search history.

(56) References Cited

U.S. PATENT DOCUMENTS

| | | | |
|---|---|---|---|
| 6,148,342 | A | 11/2000 | Ho |
| 6,484,010 | B1 | 11/2002 | Sheehan |
| 6,688,889 | B2 | 2/2004 | Wallace et al. |
| 6,808,392 | B1 | 10/2004 | Walton |
| 8,016,680 | B1 | 9/2011 | Hutter et al. |
| 8,033,831 | B2 | 10/2011 | Julia et al. |
| 8,052,426 | B2 | 11/2011 | Snyder et al. |
| 8,526,405 | B2 | 9/2013 | Curtis |
| 8,641,424 | B2 | 2/2014 | Soldavini |
| 8,753,200 | B1 | 6/2014 | Supanc et al. |
| 2002/0160347 | A1 | 10/2002 | Wallace |
| 2002/0165912 | A1 | 11/2002 | Wenocur et al. |
| 2004/0009461 | A1 | 1/2004 | Snyder et al. |
| 2004/0083229 | A1 | 4/2004 | Porter |
| 2005/0060221 | A1 | 3/2005 | Kolar et al. |
| 2006/0257841 | A1 | 11/2006 | Mangano |
| 2007/0292826 | A1 | 12/2007 | Goddy et al. |
| 2008/0040370 | A1 | 2/2008 | Bosworth et al. |
| 2009/0075709 | A1 | 3/2009 | Park |
| 2009/0170058 | A1 | 7/2009 | Walker |
| 2009/0197237 | A1 | 8/2009 | Couch et al. |
| 2010/0143873 | A1 | 6/2010 | Keim et al. |
| 2010/0293598 | A1 | 11/2010 | Collart |
| 2011/0039242 | A1 | 2/2011 | Packard et al. |
| 2011/0177480 | A1 | 7/2011 | Menon et al. |
| 2011/0189643 | A1 | 8/2011 | Hutchinson |
| 2011/0195389 | A1 | 8/2011 | DeYoung et al. |
| 2011/0202774 | A1* | 8/2011 | Kratsch ............. G06F 17/30489 713/189 |
| 2012/0040326 | A1 | 2/2012 | Larson-Rutter et al. |
| 2012/0231438 | A1 | 9/2012 | Fakhrai |
| 2014/0024009 | A1 | 1/2014 | Nealon et al. |
| 2014/0281491 | A1* | 9/2014 | Zaverucha ............. H04L 9/321 713/155 |
| 2014/0310729 | A1 | 10/2014 | Chaniotakis |
| 2015/0066940 | A1 | 3/2015 | Fernandes |
| 2015/0119120 | A1 | 4/2015 | Spagnola |
| 2015/0147741 | A1 | 5/2015 | Spagnola |
| 2015/0150144 | A1 | 5/2015 | Hughes et al. |
| 2015/0179078 | A1 | 6/2015 | Spagnola |
| 2015/0187223 | A1 | 7/2015 | Kapoor et al. |
| 2015/0199909 | A1 | 7/2015 | Spagnola |

OTHER PUBLICATIONS

Noumeir et al., "Pseudonymization of Radiology Data for Research Purposes" Journal of Digital Imaging, vol. 20, No. 3 Sep. 2007: pp. 284-295.*
Heurix et al., "Pseudonymization with metadata encryption for privacy-preserving searchable documents." System Science (HICSS), 2012 45th Hawaii International Conference on. IEEE, 2012.p. 3011-3020.*
Schneier, Wiley, "Applied Cryptography," 1996, pp. 1-2 and 10-13.
Neubauer, et al., "A methodology for the pseudonymization of medical data," International Journal of Medical Informatics 80(2011) [journal homepage: www.intl.elsevierhealth.com/journals/ijmi] Date: Oct. 16, 2010, p. 190-204.
Noumeir, et al., "Pseudonymization of Radiology Data for Research Purposes," Journal of Digital Imaging, vol. 20, No. 3, Sep. 2007, pp. 284-295.

* cited by examiner

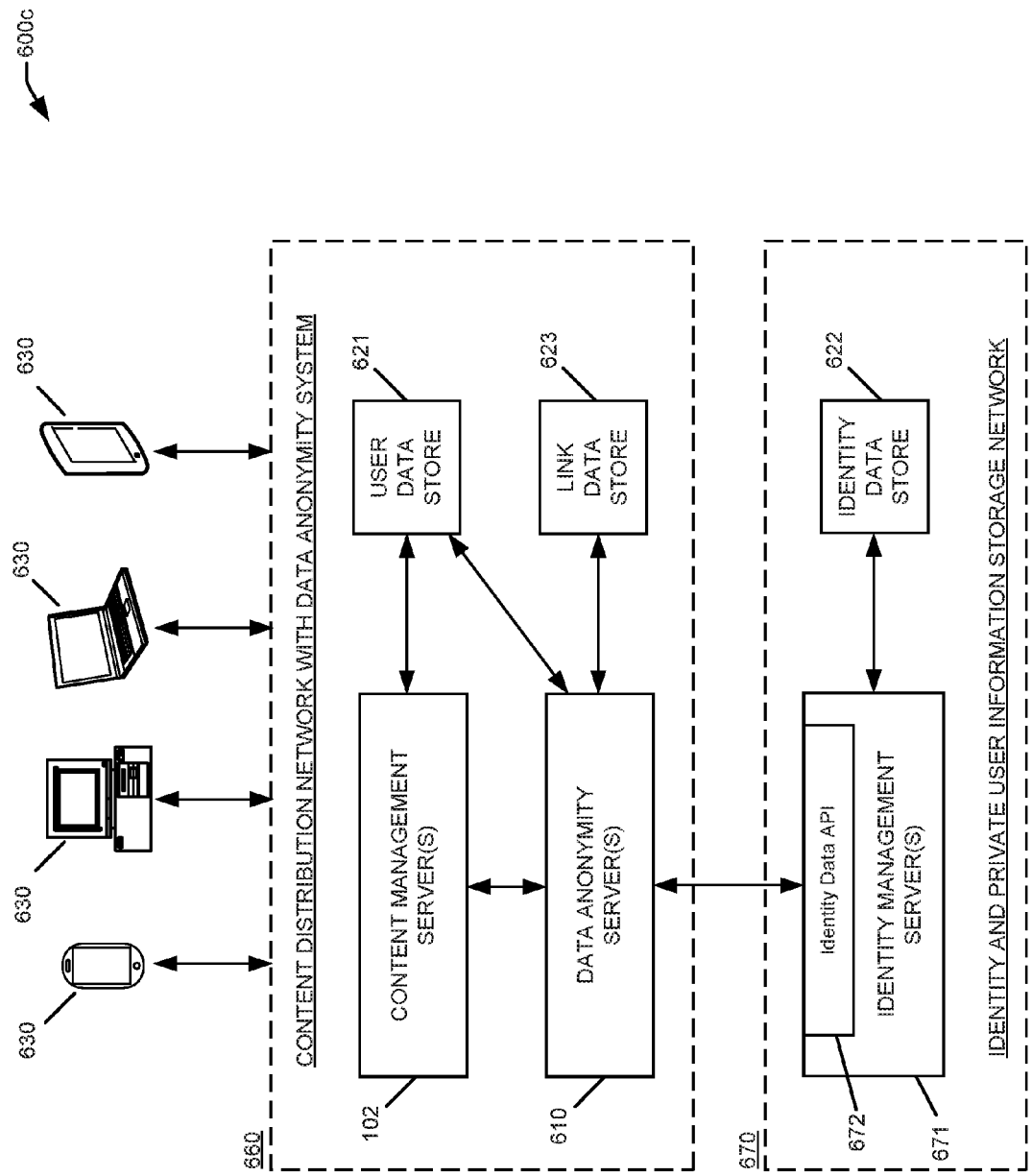

Example Identity Data

822

| User Identifier | Name | DOB | Address | Acct # | SSN | Payment Info |
|---|---|---|---|---|---|---|
| 0046711 | AAA, bbb | xx-xx-xxxx | XXXXXXXX | nnnnnnnn | xxx-xx-xxxx | nnnn-nnnn-nnnn |
| 0046722 | CCC, ddd | ... | ... | ... | ... | ... |
| 0046734 | EEE, fff | | | | | |
| 0046737 | GGG, hhh | | | | | |

FIG. 8A

Example User Data

821

| Hash Value | CDN Usage Data (e.g., resources, times, behaviors, preferences, scores, feedback, etc.) | | | |
|---|---|---|---|---|
| b89eaac7e61417341b710b | ABC 123 ... | ... | | |
| b89eaac7e61417341b710b | DEF 456 ... | ... | | |
| b89eaac7e61417341b710b | GHI 789 ... | ... | | |
| c898896f3f70f61bc3f | ... | ... | | |
| ... | | | | |

FIG. 8B

Example Link Data

823

| User Identifier | Key Value |
|---|---|
| 0046711 | m10zJ004BE4oVh79n9B2Wi933ROcHD2c |
| 0046722 | 039K46k1240Duf4rh3fXIU34N2Dt793E |
| 0046734 | LR0HaawSC9fD6t63h8n6AU0HjiULmcdC |
| 0046737 | B95FA7A7A375D91C3E7964E416 |
| ... | |

FIG. 8C

Example Identity Data

1122

| User Identifier | Name | DOB | Address | Acct # | SSN | Payment Info |
|---|---|---|---|---|---|---|
| 0046711 | AAA, bbb | xx-xx-xxxx | XXXXXXXX | nnnnnnnn | xxx-xx-xxxx | nnnn-nnnn-nnnn |
| 0046722 | CCC, ddd | ... | ... | ... | ... | ... |
| 0046734 | EEE, fff | | | | | |
| 0046737 | GGG, hhh | | | | | |

FIG. 11A

Example User Data

1121

| Hash Value | CDN Usage Data (e.g., resources, times, behaviors, preferences, scores, feedback, etc.) | | | |
|---|---|---|---|---|
| b89eaac7e61417341b710b | ABC 123 ... | ... | | |
| b89eaac7e61417341b710b | DEF 456 ... | ... | | |
| b89eaac7e61417341b710b | GHI 789 ... | ... | | |
| c898896f3f70f61bc3f | ... | ... | | |
| ... | | | | |

FIG. 11B

Example Link Data

1123

| User Identifier | Key Value |
|---|---|
| 0046711 | 00000000000000000000000000000000 |
| 0046722 | 039K46k1240Duf4rh3fXIU34N2Dt793E |
| 0046734 | LR0HaawSC9fD6t63h8n6AU0HjiULmcdC |
| 0046737 | B95FA7A7A375D91C3E7964E418 |
| ... | |

FIG. 11C

DATA ACCESS AND ANONYMITY MANAGEMENT

CROSS-REFERENCES TO RELATED APPLICATIONS

The present application is a continuation of U.S. application Ser. No. 14/724,620, filed May 28, 2015, and entitled "DATA ACCESS AND ANONYMITY MANAGEMENT," the entire contents of which are incorporated herein by reference for all purposes.

BACKGROUND

In many computer systems and networks, the protection of user identity data and other private user information is an important concern as more and more information is stored and shared electronically. The types of user identity data and private user information may vary from system to system, but generally include any data or combination of data unique to individuals, such as names, addresses, social security numbers, account numbers, passwords, employment information, demographic information, financial data, and the like. Such user identity data and private user information are common targets of cyberattacks, and several jurisdictions have enacted laws governing how such data should be used, stored, and transmitted.

Another type of data collected and stored in many computer systems and networks may be referred to as user data. User data may include personal and/or confidential information relating to users' behaviors and interactions within the computer system or network. Examples of such user data may include, without limitation, a user's web browsing history, online media resources and content requested and accessed by a user, online purchases made by a user, discussion posts submitted by a user, a user's test or evaluation scores within a system, a user's access times and usage patterns within a system, and the like. Unlike identity data, user data might not directly reveal a user's identity, but may nonetheless include personal and confidential user information that should be protected from cyberattacks and unintentional disclosures.

BRIEF SUMMARY

Various techniques (e.g., systems, methods, computer-program products tangibly embodied in a non-transitory machine-readable storage medium, etc.) are described herein providing data access and data anonymity management within various implementations of content distribution networks. In some embodiments, a data anonymity management system may include multiple different data stores configured to store identity data, user data, and/or linking data, as well as a data anonymity server configured to support data anonymity features such as active user data anonymity, one-way linking and permanently breakable links between user identity data and associated user data. For instance, a data anonymity server may receive and handle requests to access user data of a content distribution network. The data anonymity server may receive or determine a user identifier corresponding to the request, access a data store to retrieve a key value associated with the user identifier, and then may execute a cryptographic hash function to generate a hash value based on the key value. The hash value may be used to access user data, and may be regenerated each time user data is to be accessed for a particular user.

Embodiments described herein also storage systems and techniques in which identity data, user data, and link data may be stored in multiple different data stores. Each different data store may be explicitly designed and/or configured to store certain data and not to store other data, in order to implement data anonymity features such as one-way linking and permanently breakable links between user identity data and associated user data. In some cases, different processes and procedures may be implemented to control data availability, data backup, online disaster recovery, offline storage archiving, and the like, for the different data stores.

Additional techniques described herein may use cryptographic hash functions to implement one-way hashing (or one-way encryption) between identity data and user data. For example, a unique key value associated with a user identifier may be provided as input to a cryptographic hash function, generating a corresponding hash value that may be used to retrieve user data from a user data store. However, in certain embodiments, the hash value cannot be used to derive the corresponding key value, and thus also cannot be used to determine any user identity data or private user information based on the hash value and/or user data.

BRIEF DESCRIPTION OF THE DRAWINGS

FIGS. 6A-6C are block diagrams illustrating examples of systems for providing data access and data anonymity management features, according to one or more embodiments of the disclosure.

FIGS. 8A-8C are illustrative data tables containing example identity data (FIG. 8A), example user data (FIG. 8B), and example link data (FIG. 8C) associated with users in a data access and data anonymity management system, according to one or more embodiments of the disclosure.

FIGS. 11A-11C are illustrative data tables containing example identity data (FIG. 11A), example user data (FIG. 11B), and example link data (FIG. 11C) associated with users in a data access and data anonymity management system, according to one or more embodiments of the disclosure.

In the appended figures, similar components and/or features may have the same reference label. Further, various compo of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
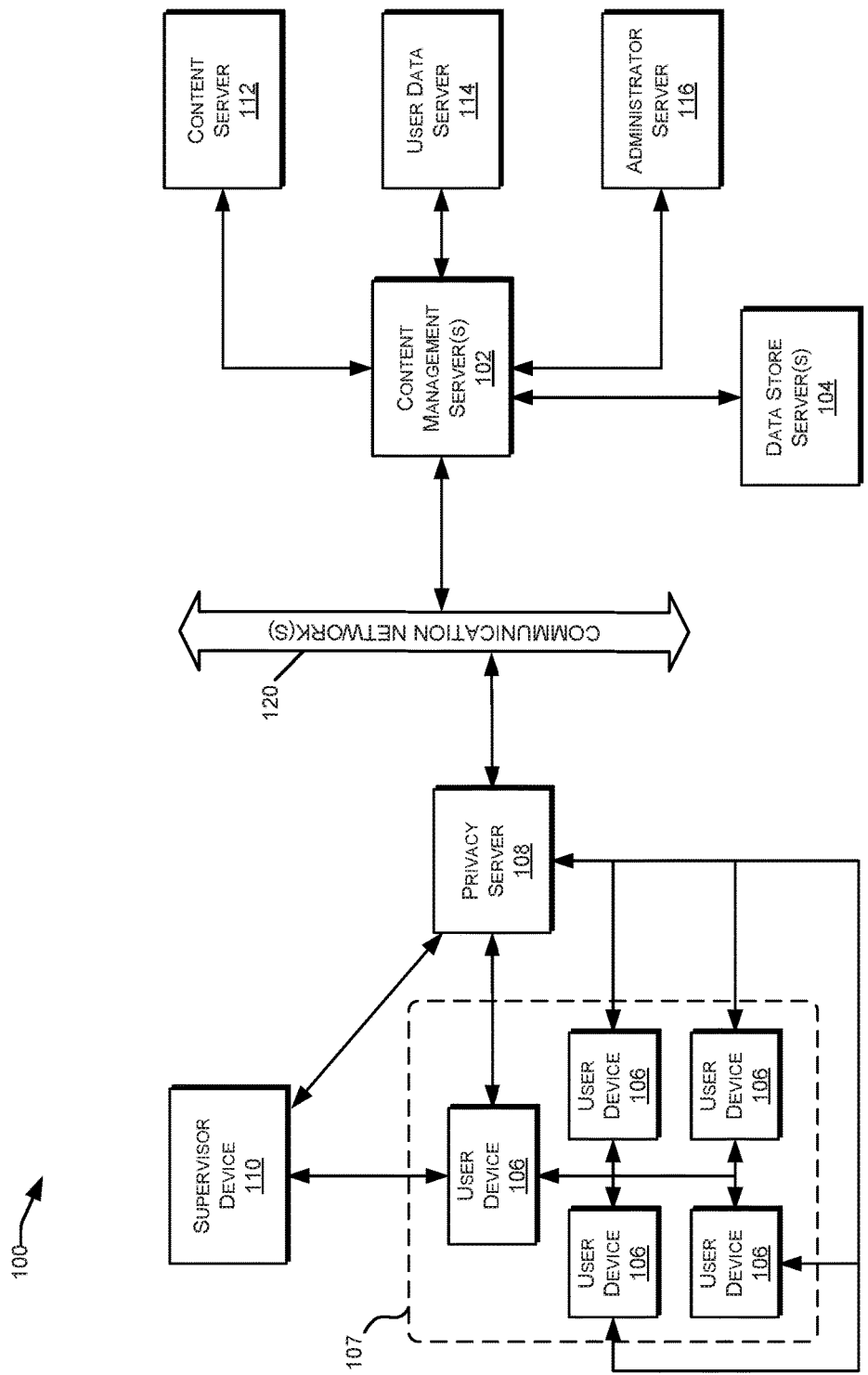
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
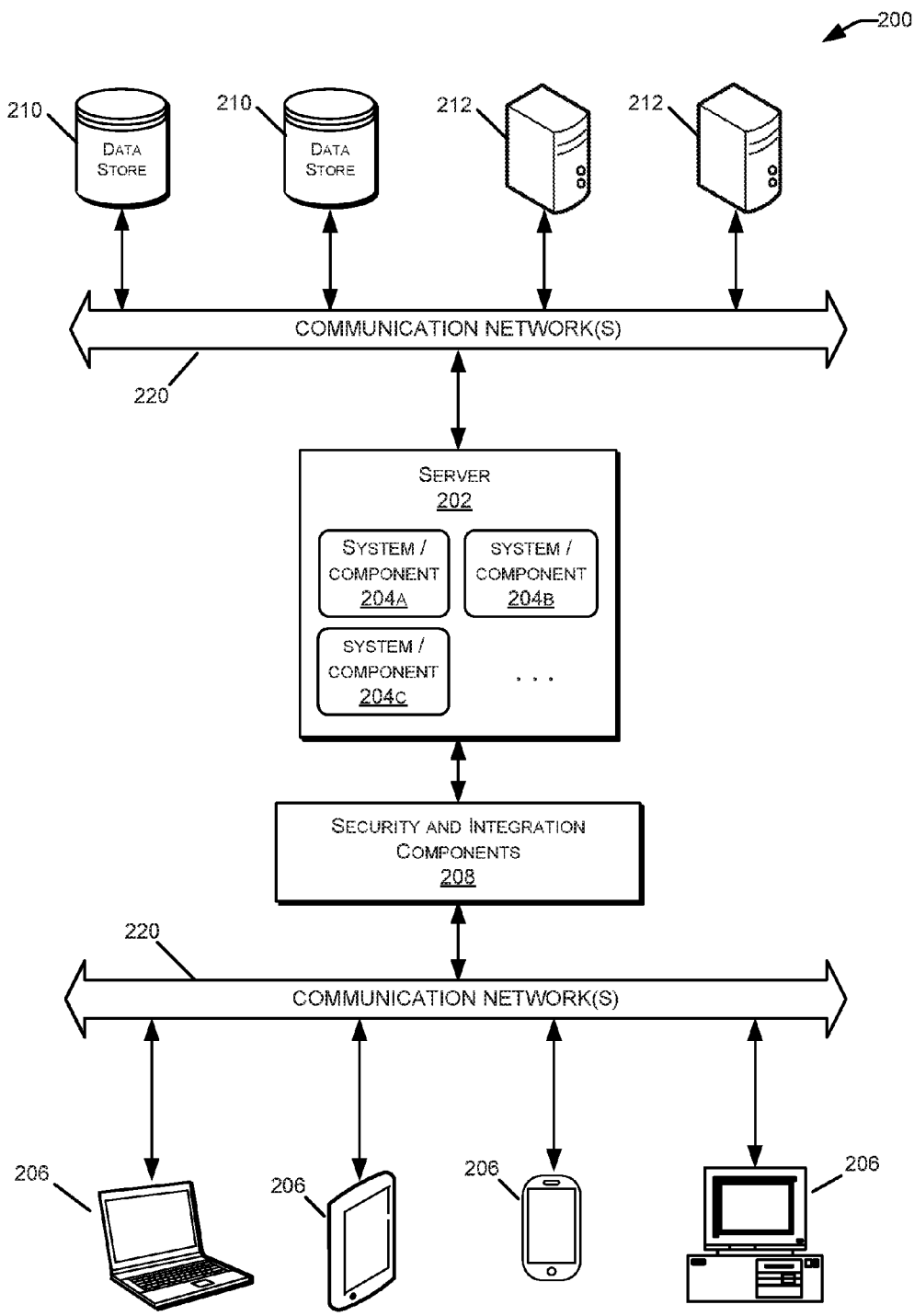
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN).

Figure 3:
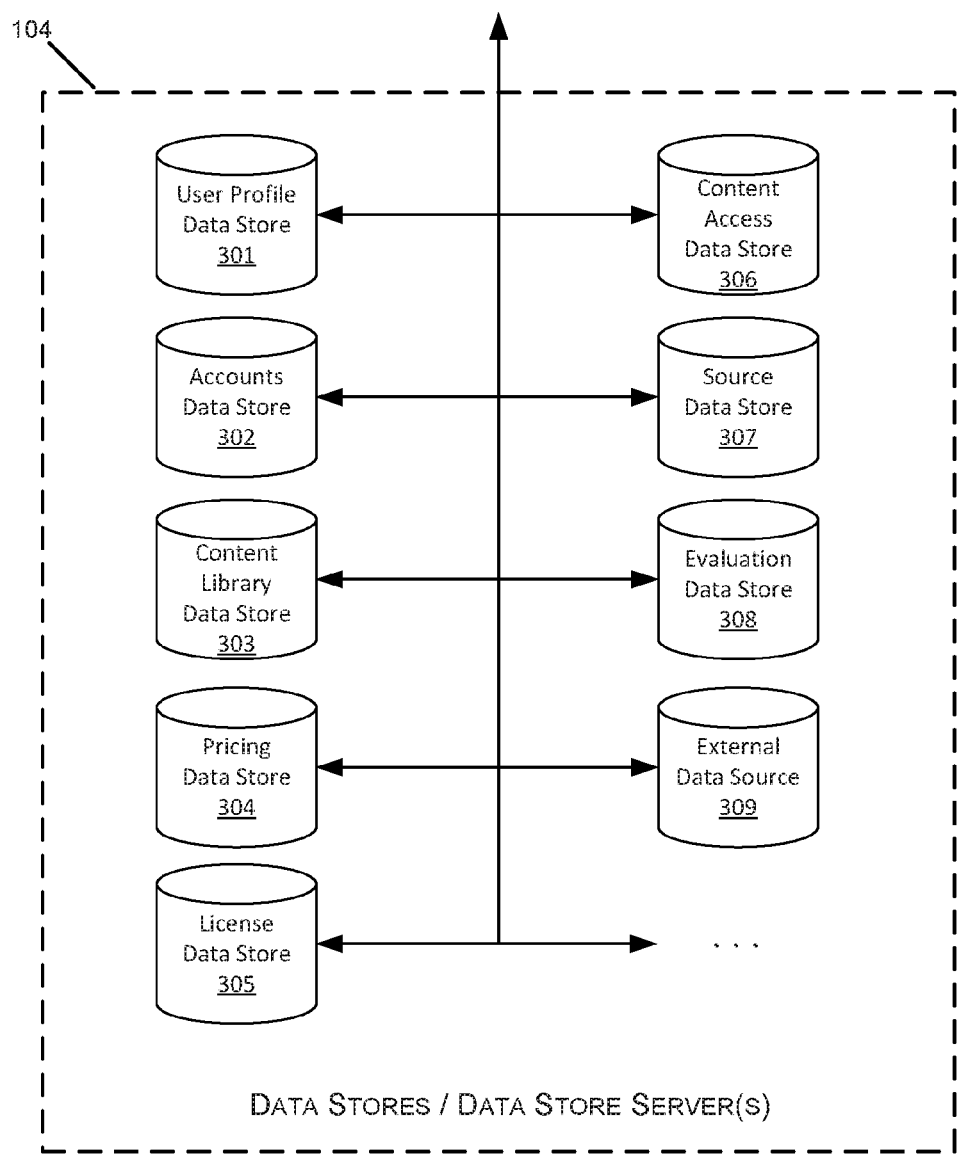
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, consumer sales data, health related data, and the like. Illustrative external data aggregators 309 may include, for example, social networking web servers, public records data stores, learning management systems, educational institution servers, business servers, consumer sales data stores, medical record data stores, etc. Data retrieved from various external data aggregators 309 may be used to verify and update user account information, suggest user content, and perform user and content evaluations.

Figure 4:
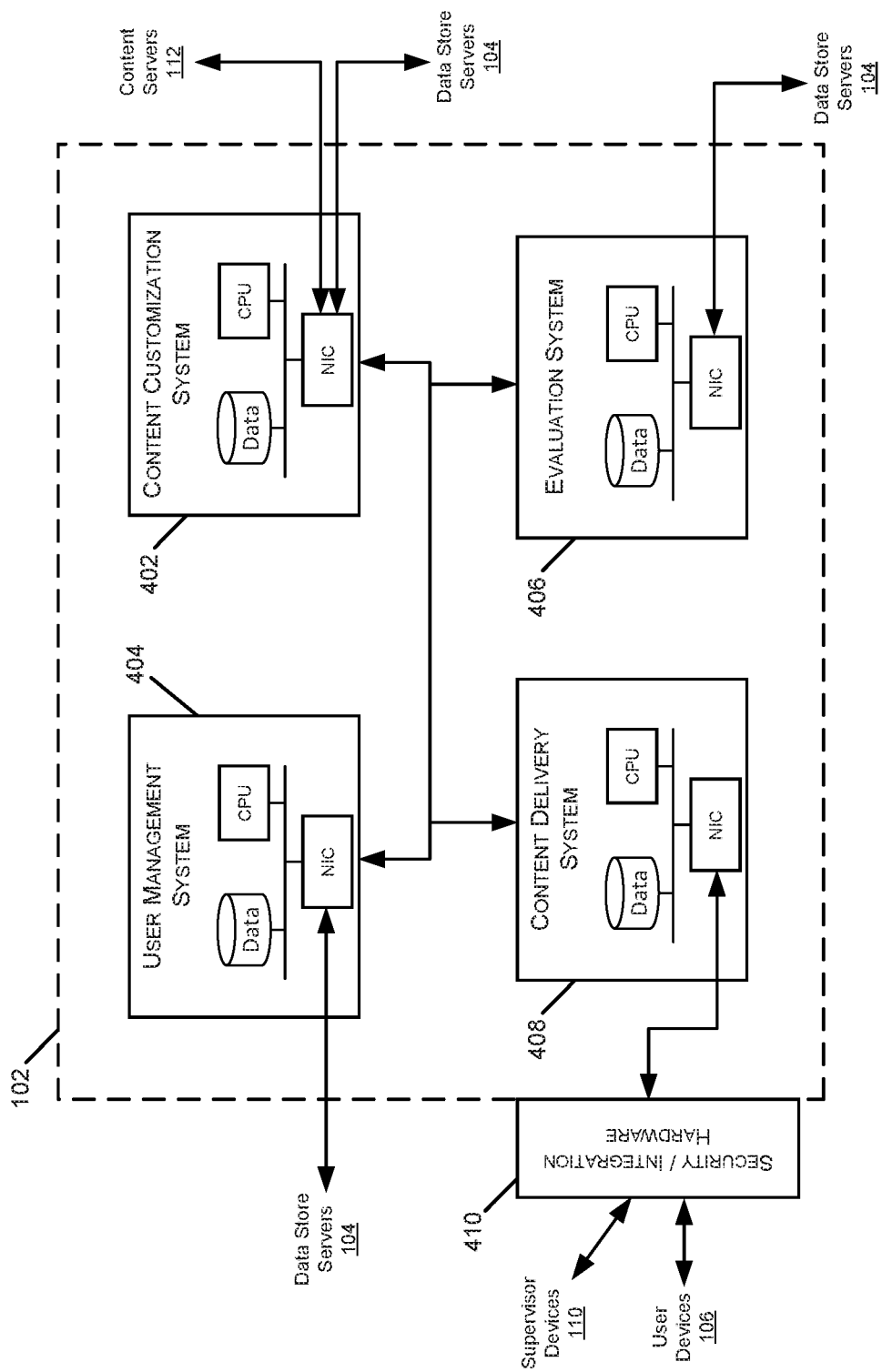
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
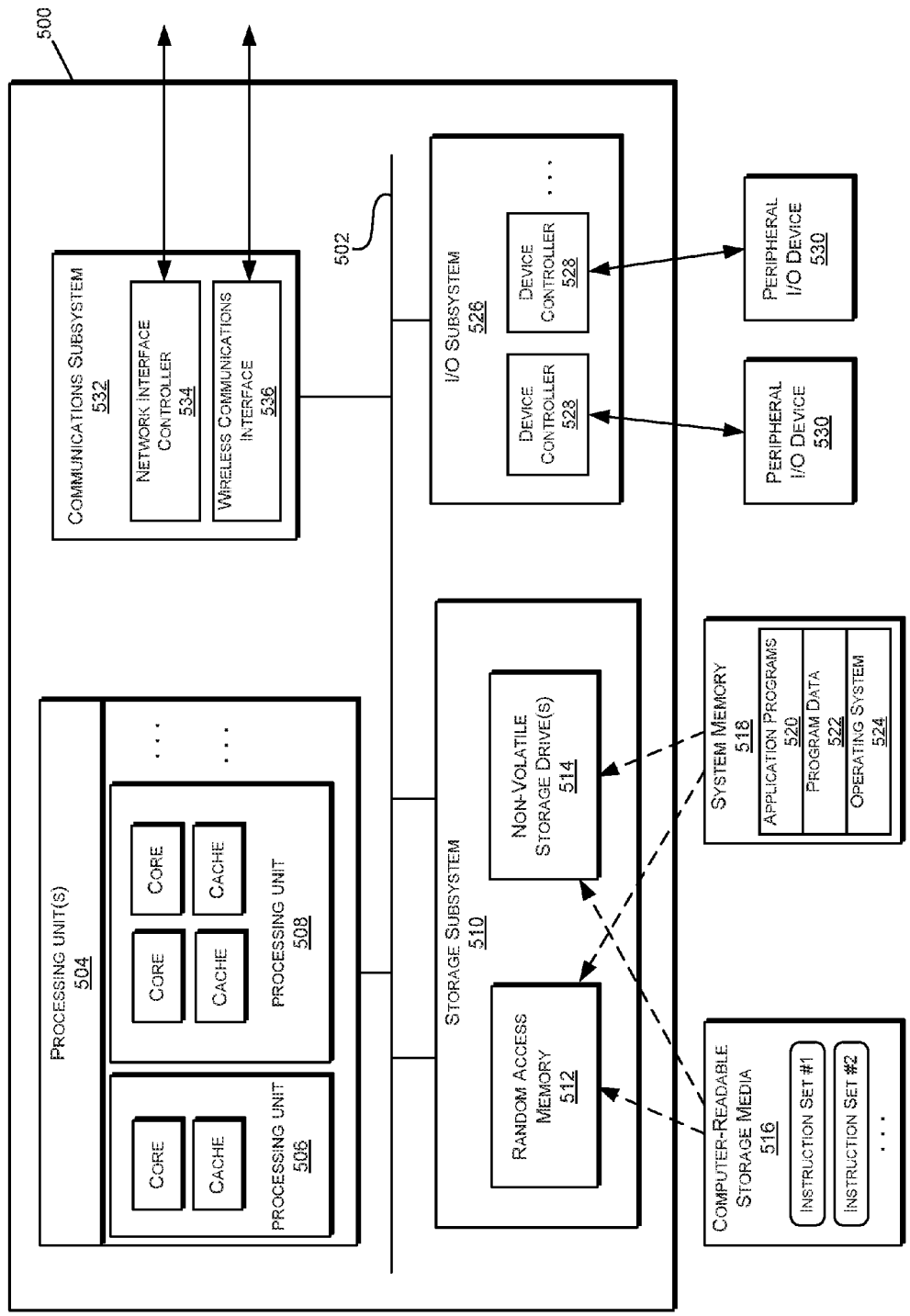
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6A:
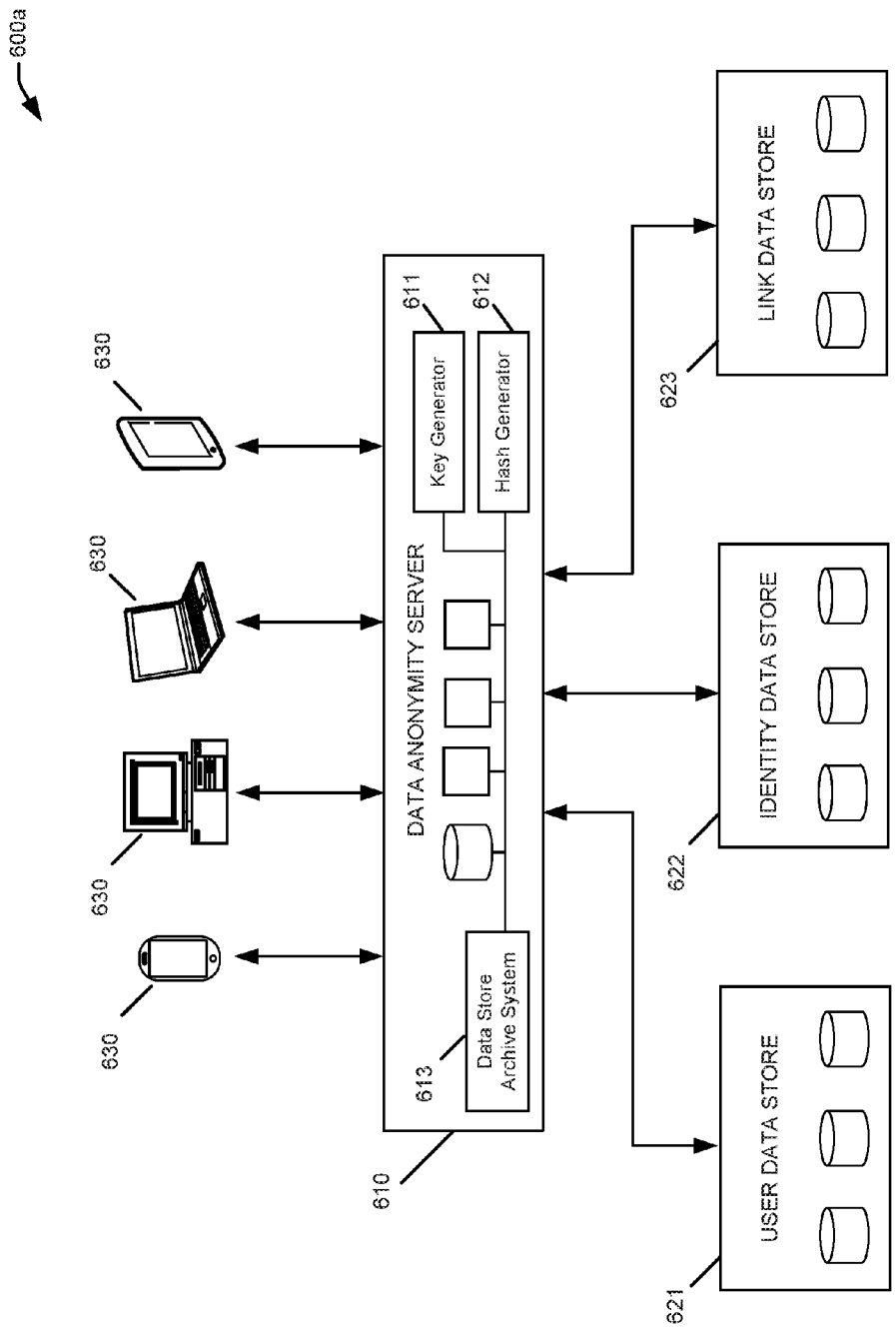
Figure 6B:
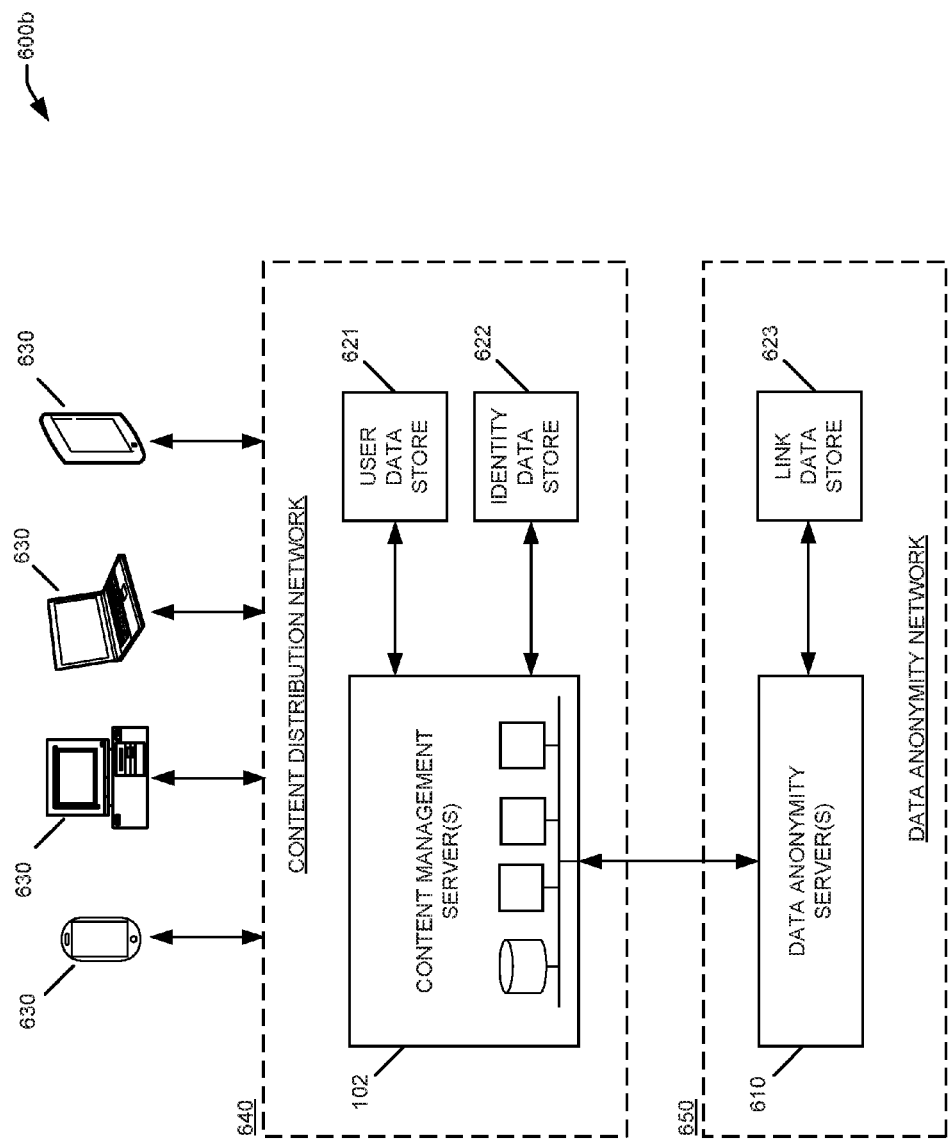

With reference now to FIGS. 6A-6C, block diagrams are shown illustrating example systems 600a, 600b, and 600c, for providing data access and supporting various data anonymity features for users interacting with content distribution networks. The data access and data anonymity management systems 600a, 600b, and 600c illustrated in this example, each of which may be interchangeably referred to simply as a data anonymity system 600, may be integrated within (or configured to operate in collaboration with) content distribution networks 100. For example, a data anonymity system 600 may correspond to a content distribution network (CDN) 100, in which a data anonymity server 610 may be a content provider or other content management server 102 within the CDN 100. In such cases, the data anonymity server 610 may receive requests directly or indirectly from client devices 630 (e.g., user devices 106 and 110) to access backend content resources or perform other CDN-supported functionality. The data anonymity server 610 may retrieve and provide the resources to clients 630 from backend content servers 112, user data servers 114, administrative servers 116, data store servers 104, etc. In other examples, the data anonymity server 610 might not directly receive and respond to requests from client devices 630, but may be implemented as another content management server 102 operating in collaboration with one or more content provider servers 102 and other backend CDN systems to provide various data anonymity management features.

In the various embodiments described herein, data anonymity systems 600 may include components configured to collect, store, and manage various types of data associated with users in CDNs 100. As discussed below, data anonymity servers 610 and/or other components within data anonymity systems 600 may be designed and configured to support features such as active user data anonymity, one-way linking from user identity data and private user information to associated user data, permanently breakable links between identity data/private data and associated user data, and the preservation of anonymous user data for purposes of evaluation, data analytics, and the like, without association to any current or previous user identity or private user data. In order to perform such features, each of the components and sub-components discussed in the example data anonymity systems 600 may correspond to a single computer server or a complex computing system including a combination of computing devices, storage devices, network components, etc. Each of these components and their respective subcomponents may be implemented in hardware, software, or a combination thereof. Further, certain components within data anonymity systems 600 may include special purpose hardware devices and/or special purpose software, such as those discussed included in the key generator 611 and hash generator 612, data store archive system 613, and data stores 621-623, discussed below.

As shown in FIGS. 6A-6C, data anonymity systems 600 may include separate data stores 621-623 for storing user data, identity data, and link data. An identity data store 622 may be designated and configured to store private user information. Private user information, which may also be referred to herein as identity data and/or personally identifiable information (PII), may include data from which the identity of a user can be determined. The scope of private user information may vary from system to system, but may generally include any data or combination of data unique to individuals, such as names, addresses, social security numbers, account numbers, passwords, employment information, demographic information, financial data, and the like.

In contrast, a user data store 621 may be designated and configured to store data relating to user interactions with and usage of the CDN 100, but from which a user generally cannot be specifically identified. Many different types of user data may be collected and stored within user data stores 621, and such user data may depend on the type and characteristics of the associated CDN(s) 100. The different types of content distribution networks 100 and/or data access and anonymity management systems 600 may include, without limitation, media distribution systems and networks, educational and professional training systems and networks, interactive gaming systems and networks, enterprise application systems and networks, and/or social networking/dating systems and networks. User data collected and stored in user data stores 621 may include, for example and without limitation, the specific resources accessed by a user in the CDN 100, resource access times, login and logout times, usage patterns and preferences within the CDN 100, user feedback, user scores, user relationships and interactions with other users, and the like. As an example, for CDNs 100 used for professional training and educational purposes, the user data may include the user's courses/classes, assignment scores, test scores and other evaluations, system usage times and patterns, system usage on different devices, discussion posts and interactions with instructors and other users, and the like. For CDNs 100 used for media distribution and/or interactive gaming, the user data may include the specific resources (e.g., music titles, games, television programs, movies, etc.) accessed by the user via the CDN 100, the access times and frequencies, devices and device types used for accessing the CDN 100, data usage amounts, content reviews and preferences, game scores, gaming records, game reviews, game playing time and patterns, purchases during gaming sessions, and the like. For CDNs 100 used for Internet access and/or eCommerce, the user data may include the system usage access times and patterns, devices and device types, browsing histories, time spent on different web pages, user histories of product purchases and indications of interest, and the like. As yet another example, for CDNs 100 used for social networking and online dating, the user data may include the system usage access times and patterns, devices and device types, histories of user discussion posts, invitations, questions and responses, and other user actions within the social networking or online dating system 100.

A third data store, referred to a link data store 623, may be included in certain data anonymity systems 600. As described below in more detail, link data stores 623 may include combinations of user identifiers and associated key values that may be used to support data access and data anonymity features.

In some embodiments, one or more user data stores 621, identity data stores 622, and/or link data stores 623 each may be configured to store certain data, and may be explicitly designed and/or configured not to store other data, in order to implement data anonymity features such as one-way linking and permanently breakable links between user identity data and associated user data. For instance, a user data store 621 may be configured to store various types of user data along with associated hash values, but in some implementations should be expressly designed and/or configured not to store user identifiers, key values, or private user information. A link data store 623 may be configured to store user identifiers and associated encryption key values, but in some implementations should be expressly designed and/or configured not to store user data, hash values, or private user information. Additionally, an identity data store 622 may be configured to store user identifiers and private user information, but in some implementations should be expressly designed and/or configured not to store user data, key values, or hash values.

Data stores 621-623 may be implemented as databases, file-based storage, and/or other storage systems. In some embodiments, data stores 621-623 may be implemented as separate and isolated storage devices, logical databases, and/or file-based logical storage structures. In some cases, one or more of the data stores 621-623 may be integrated within other system devices, such as a data anonymity server 610, other data store servers 621-623, and/or other devices within system 600. In some cases, one or more of the data stores 621-623 may be implemented as a cloud-based storage system. Each data store 621-623 may include a single computer server or combination of servers, storage devices, network components, etc. In some embodiments, data stores 621-623 may correspond to various data store servers 104 in FIG. 1 and/or FIG. 3, and may include some or all of the same hardware, software, storage and network components described above.

Additionally, in certain embodiments, data stores 621-623 may have different database backup and recovery profiles. That is, different processes and procedures may be implemented by the data anonymity server 610 and/or the individual data store servers 621-623, to control data availability, data backup, online disaster recovery, offline storage archiving, and the like, for the data stores 621-623. For example, as discussed below, the link data store 623 may be expressly designed and/or configured not to be permanently backed-up or archived in an offline storage system, thereby assuring that the associations between identity data and user data may be permanently deleted and cannot be recreated using archived data from an offline storage system. In contrast, the user data store 621 and/or identity data store 622 may be configured for periodic archiving in an offline storage system.

The data anonymity server 610 may include components and subsystems to receive, store, and manage the data within data stores 621-623 to provide various data access and data anonymity features. As discussed below, data anonymity server 610 may be configured to perform tasks such as creating new users, storing, modifying, and retrieving user data, and deleting users. In connection with these tasks, data anonymity server 610 may support various data anonymity features, such as active user data anonymity, one-way linking and permanently breakable links between user identity data and associated user data, discussed below.

In order to execute the functions and tasks described herein, the data anonymity server 610 may include a single computer server or combination of computer servers, storage devices, network components, etc. Data anonymity server 610 may be implemented using any combination of the computer hardware, software, storage, and network components discussed above, such as those in illustrative computer system 500, and also may be implemented within any of the computing environments discussed above, such as content distribution network 100 and/or distributed computing environment 200. For example, data anonymity server 610 may include secure storage device(s) to store data from data stores 621-623, processors and software execution engines for generating encryption key values, hash values, and implementing data store backup and archiving procedures, and network interface components for receiving/transmitting requests and responses to client devices 630, data stores 621-623, and other devices within the system 600 and/or CDN 100.

In some embodiments, the data anonymity server 610 may include a key generator 611 comprising specialized hardware and/or software for generating and assigning key values to users within the data anonymity system 600 and/or CDN 100. Although a key value may be any data item, in some embodiments the key generator 611 may be configured to generate large and/or random numbers or strings to be used as key values within the data anonymity system 600. For example, the key generator 611 may implement a pseudorandom number generator algorithm and/or a pseudorandom string generator algorithm. In some cases, the key generator 611 may execute a pseudorandom number generator algorithm, and then may store/convert the numerical output as a string data type, in order to avoid size limitations of various numeric data types. Thus, the key generator 611 may be implemented as a specialized software component. However, in other cases, hardware-based random number generators and/or random string generators may be used for the key generator 611.

A hash generator 612 may be implemented within the data anonymity server 610, either within the same device/component as the key generator 611 or as a separate device or component. As discussed below, the hash generator 612 may be configured to execute a cryptographic hash function on a key value input, such as the key values provided by the key generator 611 and/or stored within the link data store 623. In some embodiments, the hash generator 612 may implement a secure hash algorithm, such as the SHA-1, SHA-2, or SHA-3 standard cryptographic hash functions, or the MD5 message-digest algorithm. In other embodiments, the hash generator 612 may be a key generator in a cryptography system, in which one or more algorithms (e.g., a public key algorithm, symmetric key algorithm, etc.) are used to generate pairs of cryptographic keys. In some cases, a hash function executed by the hash generator 612 (e.g., SKEIN, KECCAK, RADIOGATUN, etc.) may output arbitrarily long data streams to be used as stream ciphers. Stream ciphers also may be built from fixed-length digest hash functions. In such cases, the hash generator 612 may include a cryptographically secure pseudorandom number generator and then use its stream of random bytes as keystream.

Data anonymity systems 600 also may include one or more data store archive systems 613. Data store archive systems 613 may be implemented within the data anonymity server 610, within data stores 621-623 (e.g., data store servers or databases), or elsewhere within the system. As discussed below in more detail, data store archive systems 613 may be configured to implement database availability policies and to perform database backup and disaster recovery tasks. For example, one or more data stores 621-623 may be mirrored or clustered to provide high-availability in the event of a failure of a hardware, software, or network component within the data store 621-623. Each data store 621-623 may include clustered databases with multiple database instances, which also may be multi-regional in some cases. Data store archive systems 613 also may be configured to initiate the creation of offline data store backups and archives, either periodically or based on event occurrences, for one or more data stores 621-623. Such offline data store archives may be implemented using removable media, such as tape or optical disk storage, and may be designed for long-term storage. Certain offline archive systems provide for read-only search and retrieval of data, and modification of the offline archives may be difficult or impossible. Thus, as discussed below, data store archive systems 613 and other components within data anonymity systems 600 may be configured expressly designed and/or configured not to create archive certain data stores offline (e.g., link data store 623), thereby supporting permanent disassociation between users and user data.

As shown in FIG. 6A, a data anonymity system 600a may be implemented on one or more computer servers and/or devices within a single data center, by a single entity or organization. For example, CDNs 100 provided and maintained by various entities (e.g., media distribution entities, eCommerce entities, interactive gaming entities, professional training or eLearning entities, etc.) may incorporate a data anonymity system 600a into the same hardware, software and/or network infrastructure of the CDN 100. In such cases, even when the components of the data anonymity system 600a are implemented on separate hardware devices, software systems, networks, etc., these components still may be under the control of the same administrators and administrative servers 116, and may operate within the same secure data centers and trusted networks, as other components within the CDN 100.

In contrast, as shown in FIGS. 6B and 6C, data anonymity systems 600 may be implemented across multiple different computer networks. Referring now to FIG. 6B, a data anonymity system 600b is shown that may be implemented across two different computer networks 640 and 650. In this example, computer network 640 may correspond to a content distribution network 100, such as a media distribution network 100, interactive gaming CDN 100, eCommerce network 100, professional training or educational CDN 100, social networking CDN 100, or any other examples of CDNs 100 described herein. The computer network 640 may be operated as a secure network of a first entity, including computer servers and devices, specialized software, and various network components, which may be implemented at one or more data centers of the first entity. In this example, network 640 may include various content management servers 102, content servers 112, administrative servers 116, and other CDN systems and components discussed above.

Data anonymity system 600b also includes a second computer network, labeled as data anonymity network 650 in this example. Computer networks 640 and 650 may correspond to two different secure networks operated by two different entities, and including computer servers and devices, specialized software, various network components, and the like, implemented within separate data centers of the first and second entities. Networks 640 and 650 may communicate over various communication networks 120 (e.g., the Internet) using secure communication channels. Due to the secure and confidential nature of the data that may be transmitted between networks 640 and 650, such as private user information, user data, key values and hash values, etc., a variety of different secure network appliances and/or secure network communication techniques and protocols may be used for implementing communication between networks 640 and 650, including any devices and techniques discussed above in reference to security and integration components 208 and/or communication networks 220.

In this example, data anonymity network 650 includes data anonymity server(s) 610 as well as a link data store 623. The data anonymity server(s) 610 in system 600b may include a key generator 611, hash generator 612, data store archive system 613, and/or some or all of the additional specialized hardware and software components discussed above in connection with the data anonymity server 610, and may be configured to perform the same functionality discussed above for providing data anonymity features.

In some cases, content distribution network 640 may operate as a fully functional CDN before ever connecting to data anonymity network 650 or data anonymity server 610. For instance, CDN 640 may include content management servers 102 along with user data store 621 and identity data store 622, and therefore it may be configured to perform any CDN-related functionality described herein, such as managing content resources, receiving and handling content requests from client device 630, and the like. In some cases, CDN 640 may be implemented and operational before the data anonymity network 650 is created or connected to the CDN 640. In such cases, the data anonymity network 650 may be implemented after the initiation of the CDN 640, as a separate system configured implement various data anonymity features within the CDN 640. In systems 600b, data anonymity networks 650 therefore may be created and destroyed, or attached and unattached, during the operation of the CDN 640 in a manner entirely transparent to client devices 630 and certain of the content management servers 102, and without affecting the primary functionality of the CDN 640.

Referring now to FIG. 6C, another example of a data anonymity system 600c is shown that may be implemented across two different computer networks 660 and 670. Similar to data anonymity system 600b, the computer networks 660 and 670 may correspond to two different secure networks operated by two different entities, and including computer servers and devices, specialized software, various network components, and the like, implemented within separate data centers of the first and second entities. As described above, networks 660 and 670 may communicate over various communication networks 120 (e.g., the Internet) using secure communication channels, and a variety of different secure network appliances and/or secure network communication techniques and protocols.

In this example, computer network 660 may correspond to a content distribution network 100, such as a media distribution network 100, eCommerce network 100, professional training or educational CDN 100, an interactive gaming CDN 100, a social networking CDN 100, or any other examples of CDNs 100 described herein. The computer network 660 may be operated as a secure network of a first entity, including computer servers and devices, specialized software, and various network components, which may be implemented at one or more data centers of the first entity. In this example, network 660 may include various content management servers 102, content servers 112, administrative servers 116, and other CDN systems and components discussed above. Additionally, the CDN 660 in this example includes a user data store 621, a link data store 623, and data anonymity servers(s) 610 (e.g., including key a generator 611, hash generator 612, data store archive system 613, etc.). Thus, CDN 660 may be configured to support some or all of the same data anonymity functionality discussed above, such as active user data anonymity, one-way linking, and permanently breakable links between user identity data and associated user data.

Data anonymity system 600c includes a second computer network, labeled as identity and private user information storage network 670, which includes one or more identity management servers 671 and identity data store 622. As discussed above, identity data store 622 may be designated and configured to store various private user information from which the identity of a user can be determined, including unique and secure data such as names, addresses, social security numbers, account numbers, passwords, and the like. Therefore, in this example, network 670 may function as a secure identity and PII storage network. Specifically, identity management server(s) 671 may be configured to receive, store, and manage any user identity data or PII associated with CDN users and/or client devices 630. The identity management server(s) 671 may provide an application programming interface (API) 672, such as a secure web service or other client-server application, to receive and handle authorized requests from the CDN 660 and/or client devices 630 for identity data and PII. As described in more detail below, the creation of an identity storage network 670 may allow CDN 660 to operate as a functional content distribution network 660 that includes support for data anonymity features, but in which user identity data and confidential PII may be securely stored separately in network 670. Therefore, in data anonymity system 600c, if any of the servers or systems within the CDN 660 are compromised by malware or subjected to a cyber-attack, then all user identity data and PII may remain secure within identity network 670.

Figure 7:
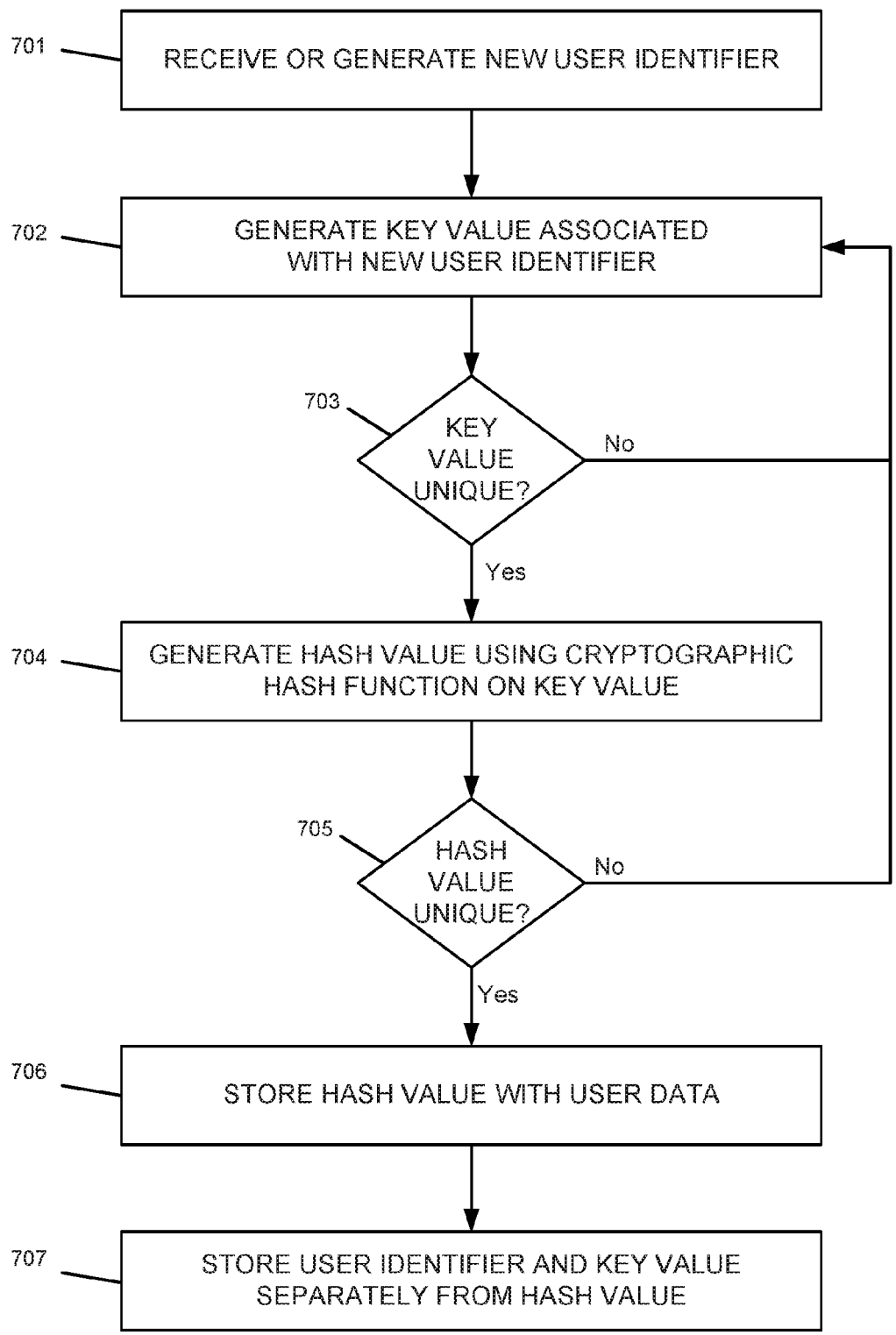
FIG. 7 is a flow diagram illustrating an example process of creating a new user within a data access and anonymity management system, according to one or more embodiments of the disclosure.

Referring now to FIG. 7, a flow diagram is shown illustrating a process of creating a new user within a data access and data anonymity management system. As described below, the steps in this process may be performed by one or more components in the example data anonymity systems 600 described above in FIGS. 6A-6C, such as data anonymity servers 610, content management servers 102, data stores 621-623, and/or identity management servers 671. However, it should be understood that the processes of providing users with data access in a CDN while and supporting data anonymity features as described herein need not be limited to the specific systems and hardware implementations described above in FIGS. 1-6, but may be performed within other computing environments comprising other combinations of the hardware and software components described herein.

In step 701, a new user identifier may be received or generated, for example, by a data anonymity server 610 within a data anonymity system 600. In various different implementations, a user identifier may be any data item (e.g., a number and/or string value), and may correspond to a user login name, account number, employee ID number, student ID number, or the like. In some cases, step 701 may be initiated after a client device 630 logs into a CDN 100 and/or data access and data anonymity system 600 and requests creation of a new account within the CDN 100 and/or system 600. For example, in data anonymity system 600a, a client device 630 may access data anonymity server 610 to request the creation of a new user account and/or new user identifier. The data anonymity server 610 may create the user account and/or user identifier, which may be selected by the user or assigned automatically by the data anonymity server 610 or other components within the CDN 100 and/or system 600a. As another example, in data anonymity system 600b, a client device 630 may access one or more content management servers 102 responsible for creating new user accounts and assigning user identifiers. In this example, a content management server 102 may transmit an indication with a new or updated user identifier to the data anonymity server 610, the indication confirming that a new user account has been created or that an existing user account has been modified. As yet another example, in data anonymity system 600c, new user identifiers either may be created within the CDN 660 (e.g., by a content management server 102 or the data anonymity server 610) and transmitted to the identity management server 671, or may be created by the identity management server 671 and transmitted back to the data anonymity server 610.

In step 702, an associated key value may be created for the user identifier received or generated in step 701. As discussed above, a key generator 611 comprising specialized hardware and/or software may be implemented within a data anonymity server 610 to generate new key values for the data anonymity system 600. A key value generated in step 702 may be any data item. However, as described above, in some embodiments, key values may be large and/or random numbers or strings. For example, the key value may be the output of a pseudorandom number or string generator algorithm 61, or output from a hardware-based random number and/or random string generator 611.

In step 703, the data anonymity server 610 may confirm the uniqueness of the key value generated in step 702. In some embodiments, the data anonymity system 600 may require both the user identifier received or generated in step 701, and the key value generated in step 702, to be unique within the system 600. Thus, the data anonymity server 610 may perform comparisons during or after of the creation of these data items to confirm their uniqueness. For example, in some embodiments, user identifiers may be stored within identity data stores 622 and link data stores 623, while key values may be stored only in link data stores 623. Thus, the data anonymity system 600 may query or analyze data stores 622-623 to confirm that any newly create user identifiers and/or key values do not already exist within the system 600. If a new key value (and/or a new user identifier) is determined to already exist within data stores 621-623 (703:No), then the duplicate may be discarded and another new key value (and/or another new user identifier) may be generated in step 702 (and/or step 701).

If the user identifier and the newly generated key value are unique within the data anonymity systems 600 (703:Yes), then the key value may be used to generate a hash value in step 704. In some embodiments, a hash generator 612 within the data anonymity server 610 may execute a cryptographic hash function using the key value as input, to create the hash value in step 704. For example, hash generator 612 may execute a secure hash algorithm (e.g., SHA-1, SHA-2, or SHA-3, MD5, etc.) and/or a key generation algorithm. Generally, any number of functions or algorithms may be used to generate the hash value in step 704, as long as the key value and hash value satisfy the requirements of one-way hashing (or one-way encryption). That is, in some embodiments, it may be a requirement of step 704 and/or of the hash generator 612, that the generated hash value must be relatively easy to reproduce given the key value (e.g., by executing the hash function again on the same key value), but the hash value cannot be used to easily derive the key value.

In step 705, the data anonymity server 610 may confirm the uniqueness of the hash value generated in step 704. As described below in more detail, when a user leaves the data anonymity system 600, their key value may be deleted, but the corresponding hash value may remain within data stores 621-623. Therefore, it is possible that even if a newly generated key value is unique within the system 600 (703: Yes), that the hash value generated in step 704 based on that key value might not be unique (705:No). In this case, the process may return to step 702, discarding both the key value and hash value and generating new ones.

If both the new key value is unique (703:Yes), and the corresponding hash value generated using that key value is unique (705:Yes), then in steps 706 and 707 the new hash value and new key value may be stored at predetermined separate storage locations within the data anonymity system 600. For example, in step 706, the hash value may be stored within the user data store 621, and in step 707, the key value may be stored within the link data store 623.

Referring now to FIGS. 8A-8C, three example data tables are shown illustrating sample data that may be stored within data stores 621-623 after creating a new user within a data anonymity system 600. FIG. 8A shows an example data table 822 including sample data that may be stored within an identity data store 622. In this example, identity data table 822 includes a unique user identifier and a corresponding set of private user information for a plurality of users within the system 600. The private user information in identity data table 822 includes a user's name, date of birth, address, account number, social security number, and payment information (e.g., credit card number or bank account data, etc.). In other examples, identity data table 822 may include any personally identifiable information (PII), or any data (or combination of data) from which a user's identity may be determined.

FIG. 8B shows an example data table 821 including sample data that may be stored within a user data store 621. In this example, user data table 821 includes a unique hash value (e.g., the hash value generated in step 704), along with a corresponding set of user data associated with the hash value. The user data in table 821 may include any of the user data described above in reference to user data store 621. Generally, such user data may include data describing or relating to a user's interactions with the CDN 100, such as network access times, network usage patterns and preferences, user discussion posts, purchases, scores, feedback data, interactions with other users, etc. In certain embodiments, the user data in example data table 821 should not include identity data or any other PII from which a user may be specifically identified. Additionally, as discussed above, the specific types of user data collected may depend on the functional purpose and computing architecture of the associated CDN 100. For example, eCommerce CDNs 100, professional training and educational CDNs 100, interactive gaming CDNs 100, media distribution CDNs 100, and social networking/dating CDNs 100 each may be designed to store different types of user data within user data stores 621 and user data tables 821.

FIG. 8C shows an example data table 823 including sample data that may be stored within a link data store 623. In this example, link data table 823 includes the same unique user identifier in identity data table 822, and an associated unique key value (e.g., the key value generated in step 702). In this example, link data table 823 may be expressly designed and/or configured not to store any identity data or PII from identity table 822, except for the user identifier. The link data table 823 also may be expressly designed and/or configured not to store any user data from user table 821.

The example data tables 821-823 in FIGS. 8A-8C also may be used to illustrate the principle of one-way hashing (also called one-way encryption), which may be a requirement of data anonymity systems 600 in some embodiments. As discussed above, the hash generator 612 may be configured to generate hash values in step 704 that are relatively easy (e.g., requiring minimal computing resources) to reproduce given the same input key value, but from which it is very difficult (and may be practically impossible depending on the available processing power and memory within the system) to derive the key value. As shown in example data tables 821-823, it may be easy to retrieve specific user data from identity data, but it may be very difficult or even impossible to determine identity data based on specific user data. To illustrate, a user identifier selected from the identity data table 822 may be used to retrieve the associated key value from the link data table 823. This key value may be provided as input to the hash function to generate the corresponding hash value, which may be used to retrieve user data from table 821. However, in contrast, a hash value selected from user data table 821 cannot be used to derive the corresponding key value in link table 823, and thus also cannot be used to determine which user in identity table 822 (if any) is associated with the selected hash value and user data in table 821. This characteristic of a data storage system may be referred to as one-way hashing or one-way encryption.

Figure 9:
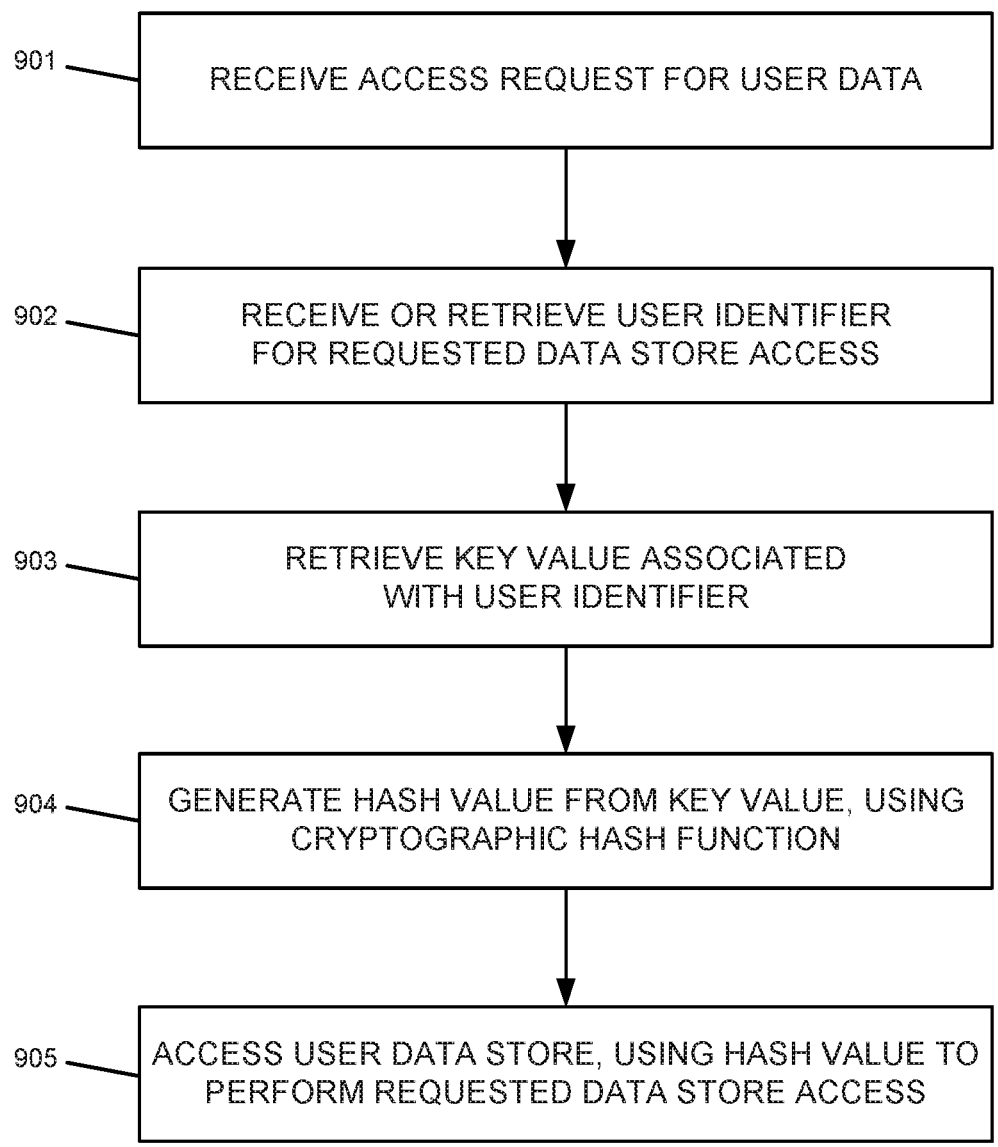
FIG. 9 is a flow diagram illustrating an example process of accessing user data within a data access and anonymity management system, according to one or more embodiments of the disclosure.

Referring now to FIG. 9, a flow diagram is shown illustrating a process of using an existing user identifier to access user data within a data access and data anonymity management system 600. As described below, the steps in this process may be performed by one or more components in the example data anonymity systems 600 described above in FIGS. 6A-6C, such as data anonymity servers 610, content management servers 102, data stores 621-623, and/or identity management servers 671. However, it should be understood that the processes of providing users with data access in a CDN while and supporting data anonymity features as described herein need not be limited to the specific systems and hardware implementations described above in FIGS. 1-6, but may be performed within other computing environments comprising other combinations of the hardware and software components described herein.

In step 901, a request is received to access user data associated with one or more specific users in a data anonymity system 600. The type of data requested in various examples may include any data stored within a user data store 621 that relates to a user's interactions with a CDN 100/system 600. For example, and without limitation, the user data requested in step 901 may include a user's access times, usage patterns and preferences, resources requested, resources consumed, discussion posts submitted or other user inputs, behaviors, purchases, scores, user feedback data, interactions with other users, and the like. Moreover, the access request received in step 901 may include a request to retrieve data from a user data store 621, but alternatively or additionally may include a request to modify data within a user data store 621, insert new user data into a user data store 621, or remove data from a user data store 621.

Requests to access user data from a user data store 621 may be initiated by a variety of different devices and systems. A data anonymity server 610 may receive such requests in step 901, directly or indirectly, from a client device 630 or other computing device within a CDN 100 and/or data anonymity system 600. For example, the request in step 901 may be a request from a content management server (CMS) 102 to insert data into a user data store 621 based on a recent set of user interactions recorded by the CMS 102 within the CDN 100. As noted above, data anonymity servers 610 may be implemented within CMSs 102 in some cases, and thus the request received in step 901 may be a request to and from processes/systems within the same server. In other examples, the request in step 901 may be a request to retrieve specific user data to perform data analyses on the user data. For instance, a CMS 102 within a CDN 100/system 600, or a third-party analytics server outside of a CDN 100/system 600, may request and analyze user data retrieved from the user data store 621. Such analyses of user data may include analyses of user behaviors within the CDN 100, user interactions and preferences within the CDN 100, performance of the various components of the CDN 100, resource usage and purchases within the CDN 100, and the like. In still other examples, the request received in step 901 may be initiated by an end user client device 630. For instance, an end user of the CDN 100/system 600 may transmit a request from a client device 630 to insert, retrieve, or modify the user's data within the user data store 621. In any of these examples, the request in step 901 may include certain identification and/or authentication data associated with the user(s) within the CDN 100/system 600 whose user data is being requested.

In step 902, one or more user identifiers may be received or retrieved by the data anonymity server 610, in connection with the request for user data. The user identifiers may correspond to the same identifiers stored in the identity data store 622 and link data store, discussed above. In some cases, user identifiers may be provided to the data anonymity server 610 along with the request in step 901. However, in other cases, the request in step 901 may include other identification or authentication information, such as a user login, account number, and/or password. Additionally, a device identifier (e.g., MAC address or IP address) may be provided with the request in step 901. Therefore, it may be necessary in some cases for the data anonymity server 610 to retrieve the user identifier(s) associated with the request.

As an example, in data anonymity system 600c shown in FIG. 6C, various client devices 630 (e.g., end user devices, system administrator client devices, third-party data analysis client devices, etc.) may transmit requests to the data anonymity server 610 within the CDN/data anonymity system 660, in order to access the user data store 621. User authentication data (e.g., a login and password) may be provided in connection with these requests. In this example, the data anonymity server 610 may first authenticate the user credentials transmitted with the request, and then confirm that the user is authorized for the requested access within the user data store 621. After confirming authentication/authorization, the data anonymity server 610 then may contact the identity storage network 670 to retrieve the corresponding user identifier(s) from the identity data store 622. For instance, the data anonymity server 610 may provide the authentication credentials associated with the request, or a set of user names or other characteristics from the request, to the identity data API 672. In response, the identity data management server 671 may retrieve the corresponding user identifiers from the identity data store 622, and transmit them back to the data anonymity server 610 via the identity data API 672.

In step 903, the data anonymity server 610 may use the user identifier (or identifiers) to retrieve the associated key value (or values). As discussed above, user identifiers and their associated key values may be stored within a link data store 623, such as example data table 823.

In step 904, the data anonymity server 610 may use the key value (or values) retrieved in step 903 to generate a corresponding hash value (or values). In some embodiments, determining the hash value that corresponds to a key value may require regenerating the hash value using a cryptographic hash function. Thus, step 904 may be similar or identical to step 704, discussed above. For example, the data anonymity server 610 may invoke hash generator 612, providing the key value as input, to regenerate the same hash value that was previously generated when the user was created within the system 600. As discussed above, certain data anonymity systems 600 may support one-way encryption, in which hash values may be generated (and consistently regenerated) from key values relatively easily, but where it may be difficult or practically impossible to derive the key value from the hash value. Such systems 600 may require a user's hash value to be regenerated in step 904 each time the user's data is accessed from user data store 621, rather than persistently storing a key-hash association that may allow the key value to be easy derived and therefore compromise the one-way encryption characteristic of the system 600.

In step 905, the hash value generated in step 904 may be used to access the user data store 621 and perform the retrievals and/or modifications of user data indicated by the request received in step 901. As discussed above, the request for access to user data may correspond to a request to retrieve a specific user's data (e.g., for analysis purposes), insert new user data associated with a specific user, or to modify or remove existing user data associated with a specific user. Any of these functions may be performed within the user data store 621, using the hash value generated in step 904. At the completion of the requested operations in step 905, the hash value generated by the data anonymity server 610 may be discarded when the process terminates.

Figure 10:
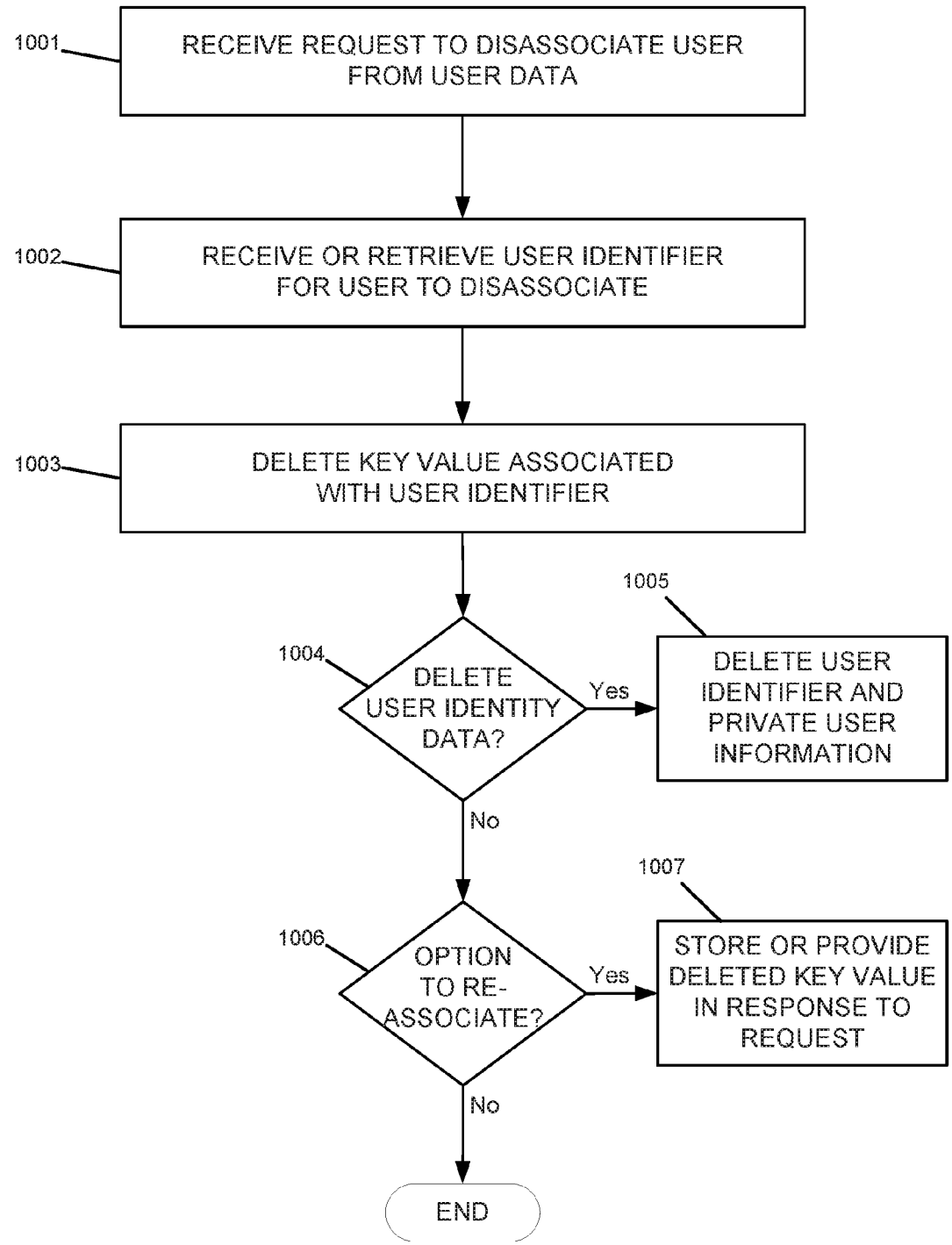
FIG. 10 is a flow diagram illustrating an example process of disassociating user data from user identity data within a data access and anonymity management system, according to one or more embodiments of the disclosure.

Referring now to FIG. 10, a flow diagram is shown illustrating a process of disassociating a user's identity data from the user's user data, within a data access and data anonymity management system 600. As described below, the steps in this process may be performed by one or more components in the example data anonymity systems 600 described above in FIGS. 6A-6C, such as data anonymity servers 610, content management servers 102, data stores 621-623, and/or identity management servers 671. However, it should be understood that the processes described herein for disassociating identity data from user data need not be limited to the specific systems and hardware implementations described above in FIGS. 1-6, but may be performed within other computing environments comprising other combinations of the hardware and software components described herein In step 1001, a request may be received to disassociate one or more users within a CDN 100 and/or data anonymity system 600 from their respective user data. Requests to disassociate users from their user data may be initiated by individual users or initiated automatically based on user data anonymity policies implemented within the CDN 100 and/or data anonymity system 600. Accordingly, requests may be received in step 1001 from a CMS 102, administrator server 104, or from various client devices 630, such as end user devices, content presenter devices, supervisor devices, or devices of system administrators, etc.

As discussed above, certain user data stored in user data store 621 may include sensitive and/or confidential information relating to users' behaviors and interactions within a CDN 100. Examples of such user data may include, without limitation, a user's resource requests, web browsing history, online purchases, discussion posts, test/evaluation scores, system access times and patterns, reviews and feedback, etc. Thus, as a matter of individual user preference, system policy, and/or legal requirements, the CDN 100/system 600 may require that it is possible to temporarily or permanently disassociate users from their user data, in such a manner that the user's identity cannot thereafter be derived from the user data. One technique of assuring that user data cannot be used to derive a user's identity is to delete all of the user's data from data store 621, including any backup data stores and offline archives. However, permanently deleting all user data may be a difficult and costly process. Furthermore, permanent deletion of user data prevents that data from being used for analyses purposes which may be valuable to the operation of the CDN 100 and/or system 600. For instance, user behaviors and interactions within a CDN 100 may be analyzed to determine usage patterns and preferences, advertising effectiveness, correlations between user behaviors and content resource selections, purchases, professional training and eLearning outcomes, and the like. Therefore, it may be desirable in some embodiments to retain user data while providing a breakable link which allows users to be permanently disassociated from their user data, so that neither the individual user, nor the system 600, nor any administrator or third-party can ever derive a user's identity from the user data in data store 621.

In step 1002, after receiving the request to dissociate a user from that user's user data, the user identifier of the corresponding user may be received or retrieved by the data anonymity server 610. Step 1002 may be similar or identical to step 902, discussed above. For example, in some cases, a user identifier may be provided to the data anonymity server 610 with the request in step 1001. However, in other cases, the data anonymity server 610 may retrieve the user identifier from an identity data store 622 based on the authentication credentials and/or other data received in connection with the request.

In step 1003, the key value associated with the user identifier received or retrieved in step 1002 may be accessed and deleted. As discussed above in step 903, the data anonymity server 610 may use the user identifier from step 1002 to access the associated key value within a link data store 623, such as example data table 823. After identifying the associated key value for the user to be disassociated, the data anonymity server 610 may delete (e.g., zero out or otherwise permanently deleting) the key value.

Referring briefly to FIGS. 11A-11C, three example data tables are shown illustrating the sample data that may be stored within data stores 621-623 after deleting a user's key value. In this example, data tables 1121-1123 may correspond to the same tables 821-823 discussed above in FIGS. 8A-8C. The only difference between tables 1121-1123 and tables 821-823 is that the first key value (i.e., for user identifier 0046711) in the example link data table 1123 has been zeroed out, for example, in response to a request to disassociate this user (i.e., user "AAA, bbb") from his/her user data.

Once the appropriate key value has been deleted in step 1003, it is no longer possible to generate the hash value corresponding to that key value. Moreover, as discussed above, the one-way encryption characteristic of certain data anonymity systems 600 may mean that it is very difficult and/or practically impossible to regenerate the deleted key value from the corresponding hash value. Therefore, after deleting the key value in step 1003, the user has been permanently disassociated from his/her user data, so that the user's identity data stored in an identity data store 622 (e.g., identity data table 1122) cannot be derived from the user's user data stored in a user data store 621 (e.g., user data table 1121). This example demonstrates a permanent disassociation, or permanent breaking of the link, between a user's identity data and the user's user data, even though all of the user's identity data and user data have been retained within the system 600.

In some embodiments, key values might only be stored in a link data store 623, such as link data table 1123, and might not be stored in within an identity data store 622 or within a user data store 621. Therefore, step 1003 might only require deleting the key value from a single location within a single data store (e.g., a database table, file storage, etc.), and need not require accessing either the identity data store 622 or the user data store 621. Additionally, as discussed above, in some embodiments the link data store 623 may be expressly designed and/or configured not to be permanently backed-up or archived in an offline storage system, thereby assuring that the associations between identity data and user data may be permanently deleted and cannot be recreated using archived data from an offline storage system. In contrast, the user data store 621 and/or identity data store 622 may be configured for periodic archiving in offline storage systems.

In step 1004, the data anonymity server 610 may determine whether or not to delete the disassociated user's identity data from the identity data store 622. In some cases, the request to disassociate a user received in step 1001 may be a request to remove the user from the CDN 100 and/or data anonymity system 600. In such cases, data anonymity server 610 may determine that the user is permanently leaving the system, and may determine that the user's identity data/private user information should be deleted from the identity data store 622 (1004:Yes), which may be performed in step 1005. Alternatively, the data anonymity server 610 may determine that the user is not leaving the system 600, or may determine for other reasons that the user's identity data should be retained within the system 600 (1004:No).

In some embodiments, the data anonymity server 610 may support permanent disassociation between users and their respective user data, while allowing the users to remain active users within the CDN 100 and/or system 600. For example, an active user may request to have all of the user's previously collected user data cleared from the system 600. In other examples, certain CDNs 100 and/or systems 600, such as eLearning CDNs and interactive gaming CDNs, may want to periodically clear all of a user's previously collected user data when the user reaches a certain age, time, or level milestone (e.g., completion of a class or grade in an eLearning CDN 100, completion of a gaming level in a gaming CDN 100, etc.). In these examples, the requested "clearing" of a user's user data is effectively performed by deleting the key value in step 1003, and the user's identity data may be retained within the system 600 (1004:No). Additionally, a new key value may be generated for the existing user, for example, by re-performing the steps 701-707 (when assigning a new user identifier to the user), or only steps 702-707 (when allowing the user to keep the same user identifier).

In step 1006, the data anonymity server 610 may determine whether or not the system 600 may provide an option to re-associate the user's identity data and user data at some future time. As described above, when the key value associated with the user's identifier is deleted in step 1003, the user becomes permanently disassociated from his/her user data. However, in some embodiments, a data anonymity server 610 may provide an option for temporary disassociation and the potential for future re-association by saving a temporary copy of the key value before permanently deleting it in step 1003. In some cases, the option to re-associate the user's identity data and user data at some future time may be given to the user or system initiating the request in step 1001. In other cases, a data anonymity server 610 may be configured either to allow or not allow future re-association, by either saving or not saving a copy of the key value before permanently deleting it from the link data store 623 in step 1003.

If the data anonymity server 610 is configured to allow future re-association of a user's identity data and user data (1006:Yes), or if the user or system initiating the disassociation in step 1001 requests the option to re-associate in the future (1006:Yes), then the data anonymity server 610 may save a copy of the key value before deleting it from the link data store 623 in step 1003. In step 1007, the data anonymity server 610 may store the key value within secure and/or encrypted storage within system 600. Alternatively or additionally, in step 1007, the data anonymity server 610 may securely transmit the key value to the user or system that requested the disassociation in step 1001. In some embodiments, the key value may be provided to the client user or system (e.g., CMS 102, administrator system 104, client device 630), and then permanently deleted from the system 600, thereby giving the client user or system complete control and autonomy over the option to re-associate the user identity and user data in the future.

If the option to allow future re-association of a user's identity data and user data is provided (1006:Yes), and the key value is retained either within the CDN 100 and/or system 600 or within a client device 630 or other external system, then the key value may be used to perform the re-association at any point in the future. For example, a user opting to rejoin the CDN 100 and/or data anonymity system 600 may provide the key value when rejoining. The data anonymity server 610 then may replace the deleted (e.g., zeroed out) key value from the link data store 623 with the key value provided by the user, thereby reestablishing the one-way encryption link between the user's identity data and user data.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A data anonymity management system comprising:
    a first data store, configured to store:
        a plurality of user data records associated with a content management system; and
        an associated hash value for each of the plurality of user data records;
    a second data store, configured to store:
        a plurality of user identifiers; and
        an associated key value for each of the plurality of user identifiers,
    wherein neither the first data store nor the second data store is configured to store private user information associated with any of the plurality of user identifiers, and
    wherein the first data store is configured not to store any of the plurality of user identifiers stored in the second data store, and
    wherein the second data store is configured not to store any of the plurality of hash values stored in the first data store; and
    a data anonymity server comprising:
        a processing unit comprising one or more processors; and
        memory coupled with and readable by the processing unit and storing therein a set of instructions which, when executed by the processing unit, causes the data anonymity server to:
            receive a request to access user data associated with a first user of the content management system, wherein at least a portion of the user data associated with the first user is stored in the first data store;
            generate a first hash value, by executing a cryptographic hash function, using a first key value associated with the first user and stored in the second data store as an input to the cryptographic hash function;
            use the first hash value to perform the requested access of the user data associated with the first user within the first data store;
            receive a request to disassociate the first user from one or more user data records stored in the first data store and associated with the first user; and
            in response to the request to disassociate, delete the first key value associated with the first user and used as input to the cryptographic hash function, from the second data store.

2. The data anonymity management system of claim 1, further comprising:
    a third data store, comprising one or more memory systems configured to store:
        a plurality of user identifiers, corresponding to the plurality of user identifiers in the second data store; and
        associated private user information for each of the plurality of user identifiers.

3. The data anonymity management system of claim 1, further comprising:
    a data store archive system, wherein the data store archive system is configured to generate and store an offline storage archive corresponding to the first data store, and wherein the data store archive system is configured not to store an offline storage archive corresponding to the second data store.

4. The data anonymity management system of claim 1, wherein the request to access the user data associated with a first user corresponds to at least one of:
    a request to retrieve data from the content management system associated with the first user;
    a request to modify data from the content management system associated with the first user; or
    a request to insert data from the content management system associated with the first user.

5. The anonymity management system of claim 1, the memory of the data anonymity server storing further instructions which, when executed by the processing unit, cause the data anonymity server to:
    in response to the request to disassociate, and prior to deleting the first key value associated with the first user from the second data store, transmit the first key value to a client device.

6. The anonymity management system of claim 1, further comprising a pseudorandom value generator configured to:
    execute at least one of a pseudorandom number generator algorithm or a pseudorandom string generator algorithm,
    wherein the first key value comprises a data item generated by the pseudorandom value generator.

7. The data anonymity management system of claim 1, wherein:
    each of the plurality of hash values stored in the first data store is a unique value, and
    each of the plurality of key values stored in the second data store is a unique value.

8. A method comprising:
receiving a request to access user data associated with a first user of a content management system, wherein at least a portion of the user data associated with the first user is stored in a first data store configured to store a plurality of user data records and an associated hash value for each of the plurality of user data records;
generating a first hash value, by executing a cryptographic hash function, using a first key value associated with the first user and stored in a second data store as an input to the cryptographic hash function, wherein the second data store is configured to store a plurality of user identifiers and an associated key value for each of the plurality of user identifiers, wherein neither the first data store nor the second data store is configured to store private user information associated with any of the plurality of user identifiers, wherein the first data store is configured not to store any of the plurality of user identifiers stored in the second data store, and wherein the second data store is configured not to store any of the plurality of hash values stored in the first data store;
using the first hash value to perform the requested access of the user data associated with the first user within the first data store;
receiving a request to disassociate the first user from one or more user data records stored in the first data store; and
in response to the request to disassociate, delete the first key value associated with the first user and used as input to the cryptographic hash function, from the second data store.

9. The method of claim 8, further comprising:
generating and storing an offline storage archive corresponding to the first data store, wherein said generating and storing does not include generating and storing an offline storage archive corresponding to the second data store.

10. The method of claim 8, wherein the request to access the user data associated with a first user corresponds to at least one of:
a request to retrieve data from the content management system associated with the first user;
a request to modify data from the content management system associated with the first user; or
a request to insert data from the content management system associated with the first user.

11. The method of claim 8, further comprising:
in response to the request to disassociate, and prior to deleting the first key value associated with the first user from the second data store, transmitting the first key value to a client device associated with the first user.

12. A computer-program product tangibly embodied in a non-transitory machine-readable storage medium, including instructions configured to cause one or more data processors to perform actions including:
receiving a request to access user data associated with a first user of a content management system, wherein at least a portion of the user data associated with the first user is stored in a first data store configured to store a plurality of user data records and an associated hash value for each of the plurality of user data records;
generating a first hash value, by executing a cryptographic hash function, using a first key value associated with the first user and stored in a second data store as an input to the cryptographic hash function, wherein the second data store is configured to store a plurality of user identifiers and an associated key value for each of the plurality of user identifiers, wherein neither the first data store nor the second data store is configured to store private user information associated with any of the plurality of user identifiers, wherein the first data store is configured not to store any of the plurality of user identifiers stored in the second data store, and wherein the second data store is configured not to store any of the plurality of hash values stored in the first data store;
using the first hash value to perform the requested access of the user data associated with the first user within the first data store;
receiving a request to disassociate the first user from one or more user data records stored in the first data store; and
in response to the request to disassociate, delete the first key value associated with the first user and used as input to the cryptographic hash function, from the second data store.

13. The computer-program product of claim 12, the instructions further configured to cause the one or more data processors to perform actions including:
generating and storing an offline storage archive corresponding to the first data store, wherein said generating and storing does not include generating and storing an offline storage archive corresponding to the second data store.

14. The data anonymity management system of claim 1, wherein the disassociation of the first user from the user data records stored in the first data store is performed without altering any data stored in the first data store.

15. The data anonymity management system of claim 2, wherein the disassociation of the first user from the user data records stored in the first data store is performed without altering any data stored in the first data store or any data stored in the third data store.

16. The data anonymity management system of claim 15, wherein following the disassociation of the first user from the user data records stored in the first data store, the first hash value cannot be generated based on any of the key values stored in the second data store.

17. The method of claim 8, wherein the disassociation of the first user from the user data records stored in the first data store is performed without altering any data stored in the first data store.

18. The computer-program product of claim 12, wherein the disassociation of the first user from the user data records stored in the first data store is performed without altering any data stored in the first data store.

19. The method of claim 8, further comprising:
executing at least one of a pseudorandom number generator algorithm or a pseudorandom string generator algorithm,
wherein the first key value comprises a data item generated by the pseudorandom number generator algorithm or the pseudorandom string generator algorithm.

20. The computer-program product of claim 12, the instructions further configured to cause the one or more data processors to perform actions including:
executing at least one of a pseudorandom number generator algorithm or a pseudorandom string generator algorithm,
wherein the first key value comprises a data item generated by the pseudorandom number generator algorithm or the pseudorandom string generator algorithm.

* * * * *